Dec. 14, 1926.

S. W. BALCH 1,610,412

SHIP'S COURSE AND POSITION INDICATOR

Filed Nov. 13, 1922   5 Sheets-Sheet 1

Inventor,
Samuel W. Balch

Dec. 14, 1926.
S. W. BALCH
SHIP'S COURSE AND POSITION INDICATOR
Filed Nov. 13, 1922   5 Sheets-Sheet 2
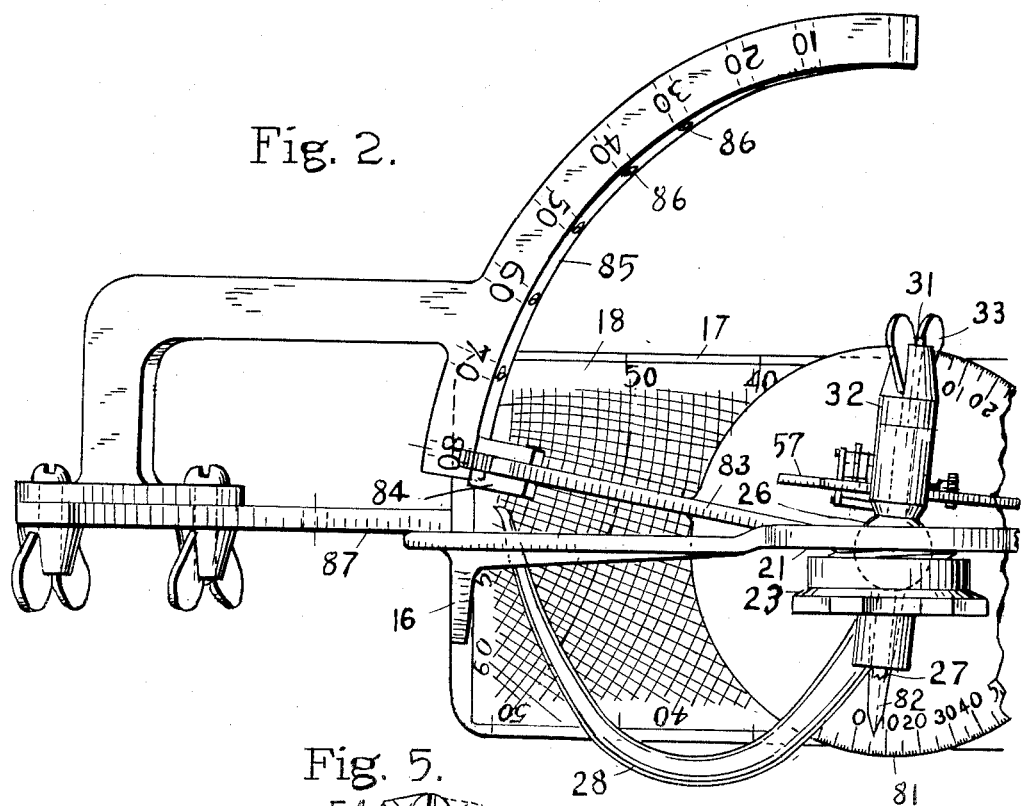
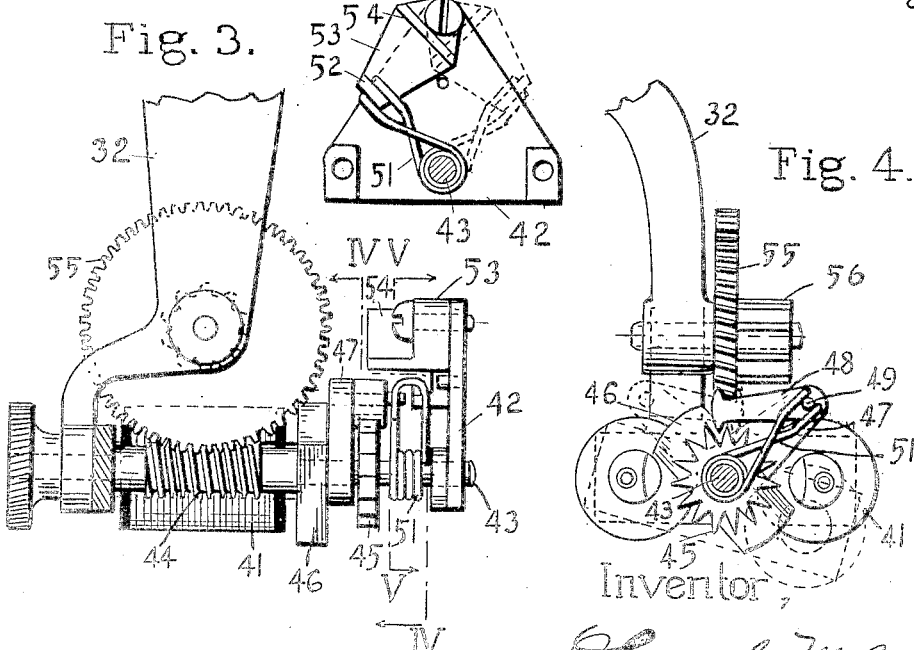
Inventor,
Samuel W. Balch

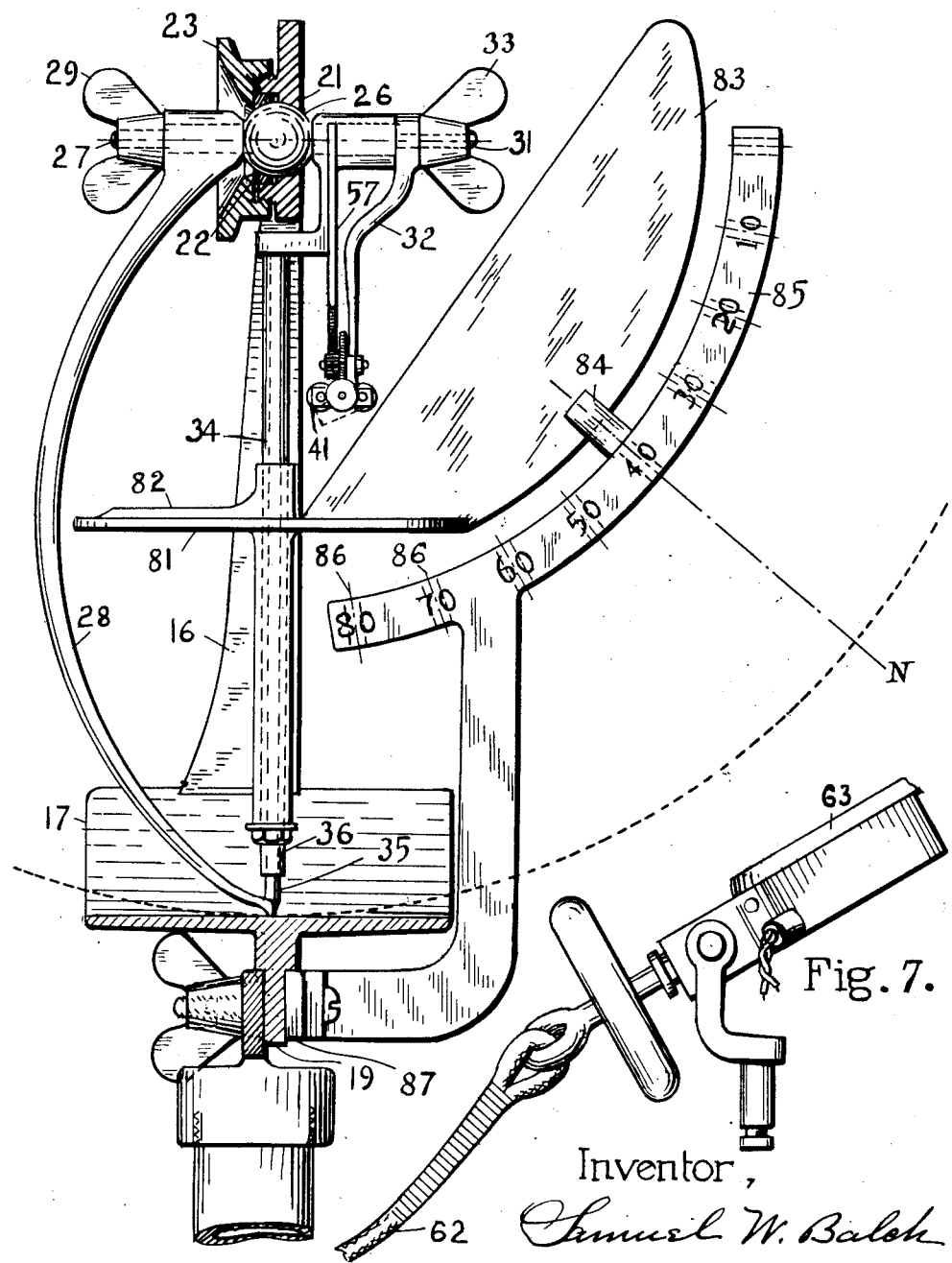

Dec. 14, 1926.

S. W. BALCH 1,610,412

SHIP'S COURSE AND POSITION INDICATOR

Filed Nov. 13, 1922   5 Sheets-Sheet 4

Inventor,
Samuel W. Balch

Dec. 14, 1926.

S. W. BALCH 1,610,412

SHIP'S COURSE AND POSITION INDICATOR

Filed Nov. 13, 1922     5 Sheets-Sheet 5

Inventor,
Samuel W. Balch

Patented Dec. 14, 1926.

1,610,412

UNITED STATES PATENT OFFICE.

SAMUEL W. BALCH, OF MONTCLAIR, NEW JERSEY.

SHIP'S COURSE AND POSITION INDICATOR.

Application filed November 13, 1922. Serial No. 600,547.

The object of this invention is to provide an instrument for use on shipboard by which the determination of position is facilitated when dead reckoning must be relied upon, and by which the direction is indicated which should be steered in order to follow the course of the great circle to the destination. Further objects are to provide an instrument which is adapted to a chart of sufficiently large scale and yet which will take up but little space in the pilot house. The principle is such that all requisite adjustments are obvious and the construction is such that they are readily made so that mistakes are avoided and the information required for directing the vessel along the shortest course to the destination is given in a readily understood manner and so that it may be utilized with a minimum chance of error.

In the accompanying five sheets of drawings which form a part of this specification—

Fig. 2 is a plan view of the same.

Fig. 3 is an elevation of the automatic propelling means for the position indicator drawn to an enlarged scale, Fig. 4 is a section through the same on the line IV—IV of Fig. 3, and Fig. 5 is a section through the same on the line V—V of Fig. 3.

Fig. 6 is a vertical section through the frame of the instrument on the line VI—VI of Fig. 1, all of the movable and adjustable parts being brought into a vertical plane.

Fig. 7 is an elevation of the indicating head of a taffrail log wherein is located the contacts of the electric circuit for actuating the instrument.

Figure 1:
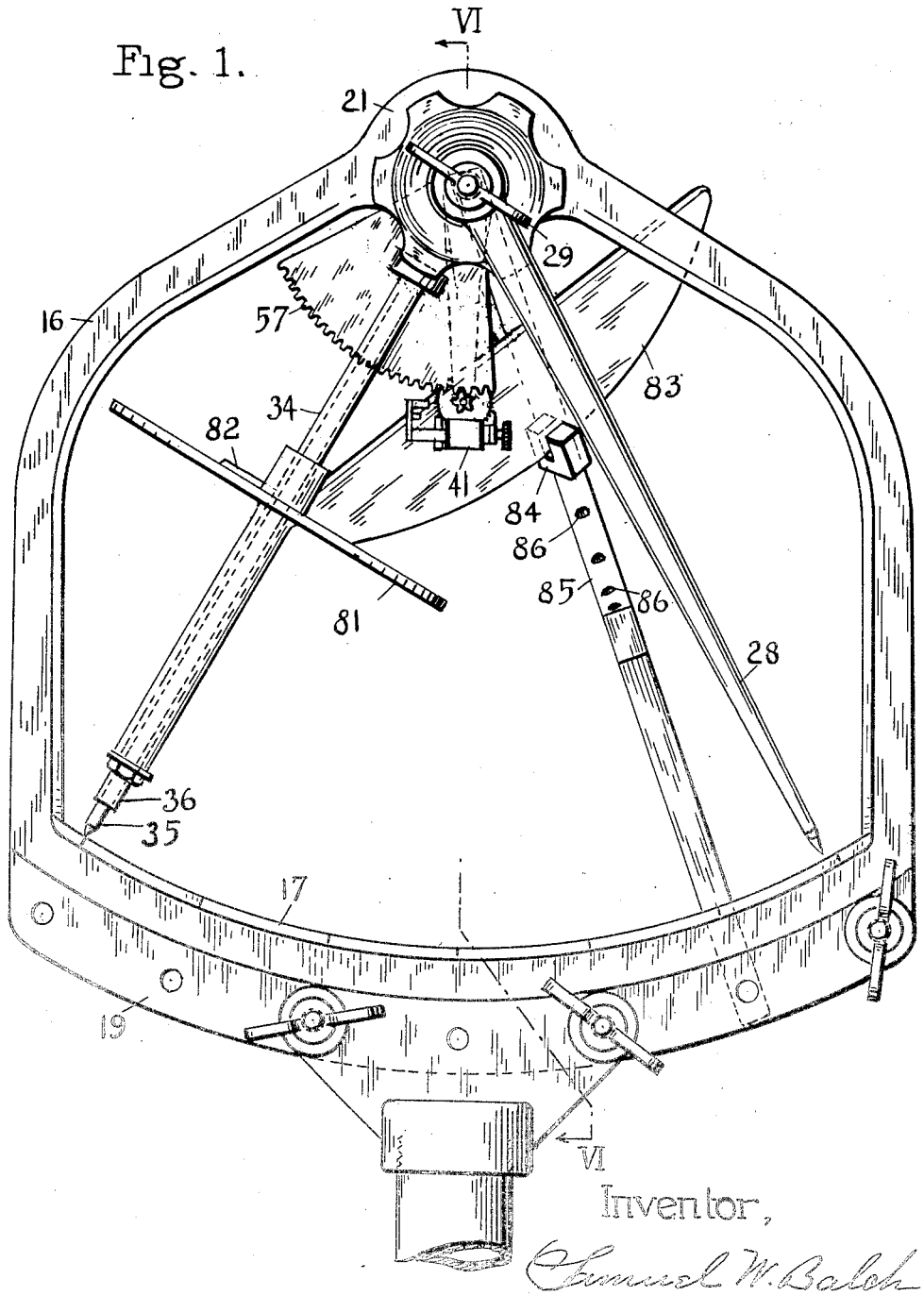
Figure 1 is a front elevation of an instrument which embodies this invention.
Figure 8:
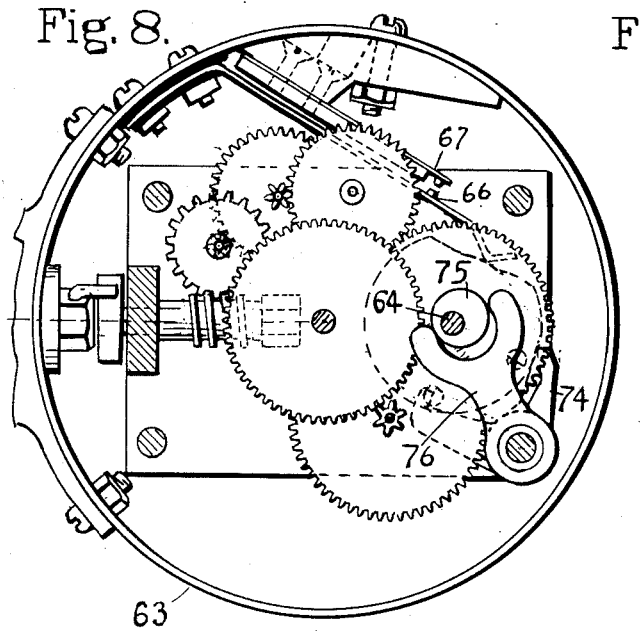
Fig. 8 is a plan of the gear train of the indicating head showing the contact springs.
Figure 9:
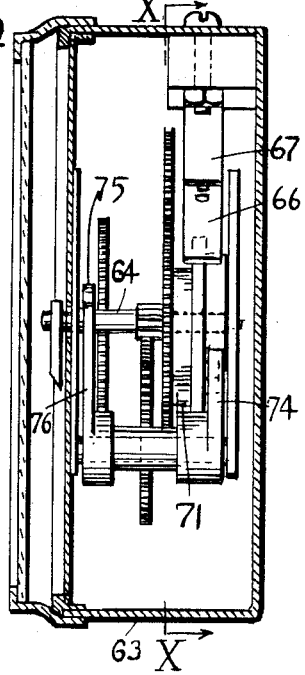
Fig. 9 is an elevation of the same.
Figure 10:
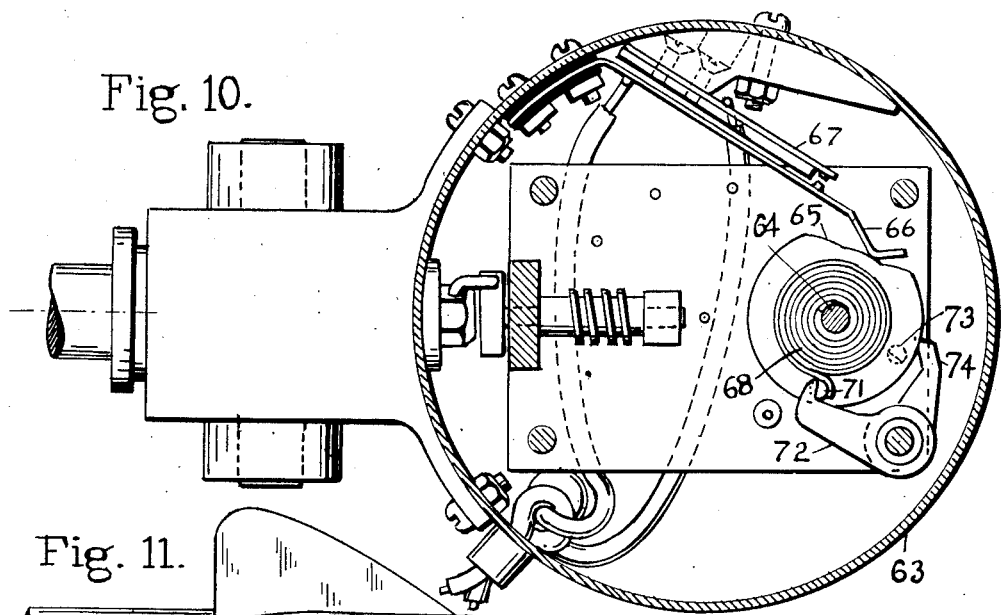
Fig. 10 is a sectional plan of the same on the line X—X of Fig. 9 showing the cam for closing the contacts and the escapement therefor.
Figure 11:
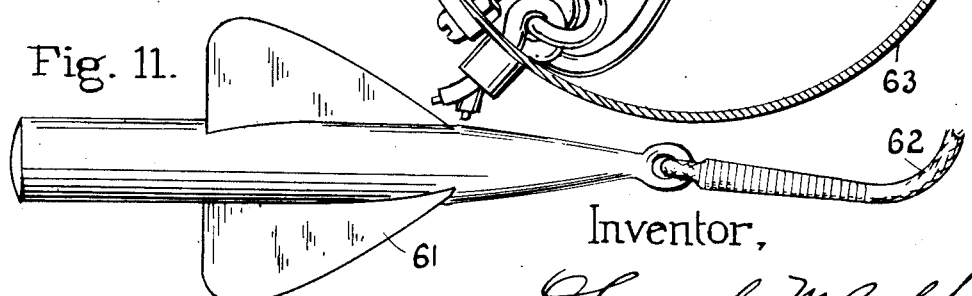
Fig. 11 is a view of the ship's log which is connected to the indicating head.
Figure 12:
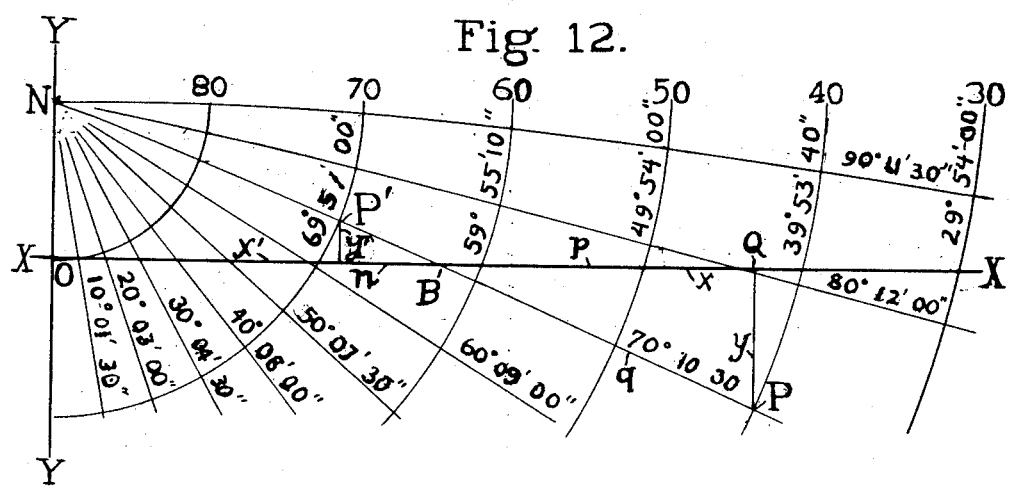
Fig. 12 is a plot of latitude and longitude lines included within an area of ten degrees to either side of a great circle which is used as the axis of a chart to be used with the instrument.
Figure 13:
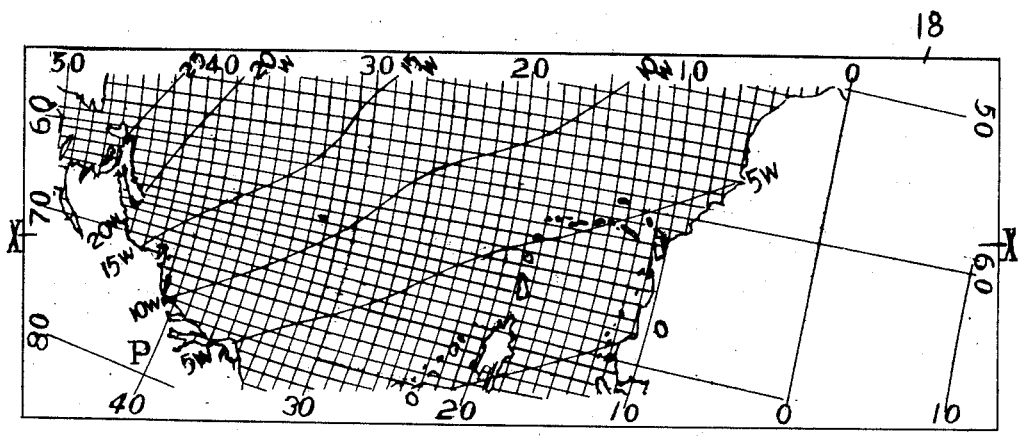
Fig. 13 is a chart adapted to be used with the instrument, based in part on the plot of the preceeding figure and in part on a plot of a continuation along the great circle axis thereof.

The instrument comprises a chart support consisting of a frame 16 with a cylindrically concave table 17 upon which a chart 18 may be supported. Under the table is a great circle arc 19. In the axis of the concavity of the table is a ball-socket in two parts one of which 21 is carried by the frame and the other of which 22 is engaged by a clamping nut 23. A ball 26 which is clamped in the socket has a projecting stem 27 to which an arm 28 is secured which is set so as to point to the vessel's destination on the chart with respect to the great circle along which the navigator is undertaking to direct the vessel. By destination, the port which is to be made is to be understood only when a clear great circle course can be drawn through it from the position of the vessel. Where a course must be followed which is made up of two or more great circle courses in order to avoid obstructions to navigation the destination as herein used may be the junction point of two such courses at which on being reached by the vessel the instrument must be reset. The connection between the arm and stem may be loosened at the wing nut 29 but the arm is preferably released for setting at the ball socket for it is then freed for setting in any direction. From the ball there is an oppositely projecting stem 31 on which is mounted an arm 32 for the support of suitable automatic propelling mechanism. This arm is clamped by a wing nut 33. The destination indicating arm, the ball with its stems and the arm with the propelling mechanism usually remain secured together and are operatively the destination indicating member.

A bearing formed on one of the projecting stems from the ball carries a position indicating arm 34. The arm may have a pencil or pen point 35 to make a pencil or ink mark as it traverses the chart and leave a permanent record thereon. In this case the point should be carried by a telescoping part 36 so that it will reach and bear against the chart and make a mark and the telescoping movement should be along a radius or line through the ball joint. This telescoping feature is also useful if the point is used only as an indicator for the position is more closely indicated when the pointer touches the chart and any permanent adjustment as to length which is correct for indicating near the middle of the chart will be too short for close indication near the side margins. The chart lies on the surface of a cylinder which is tangent to an imaginary sphere about the center of which the arm is movable and the arm must be lengthened to reach any point of the chart on either side of the great circle of tangency. A toothed segment 57 having as its axis the bearing of the position indicating arm is an integral part thereof, the two constituting the position indicating member.

The position indicating member is automatically moved toward the destination indicating member proportionally to the speed of the vessel. The driving mechanism (Figs. 3, 4, and 5) includes a two-spool electromagnet 41 the poles of which are bridged by a bearing plate 42 of nonmagnetic material. Between and parallel with the poles of the magnet is an arbor 43 which is journalled in the bearing plate and the base plate of the electromagnet. Attached to this arbor are a single thread worm 44 and a fifteen-tooth ratchet 45. Loose on the arbor are an armature 46 and a pawl arm 47 which carries a pawl 48. The pin 49 on which the pawl is hinged is engaged between the two recurved ends of a torsion spring 51 and the two ends also engage a lip 52 on a block 53 which is pivoted to the bearing plate and carried thereby. The spring normally holds the pawl pin 49 opposite the lip 52 and the armature out of alignment with the poles of the magnet. When the magnet is energized the armature is attracted into line between the poles and the pawl is stopped by striking a shoulder 54 on the block so that the feed is limited to one tooth of the ratchet each time that the magnet is energized. The parts can be reversed to the positions indicated by dotted lines in Figs. 4 and 5 and the direction of feed will then be reversed. The worm engages a worm wheel 55 with sixty teeth and a pinion 56 attached to this wheel meshes with the toothed segment 57 which is attached to the position indicating arm. The tooth ratio between the pinion and segment is one to twenty-four. Each actuation of the electromagnet therefore moves the position indicating member through one minute of arc. The electromagnet is attached to its supporting arm in such a manner that it can be dropped to the position indicated by dotted lines in Figs. 4 and 6. This disengages the worm from the worm wheel for quick setting relatively to each other of the position and destination indicating members.

The circuit through the electromagnet may be controlled by any instrumentality which moves proportionately to the speed of the vessel, as for example a taffrail log 61. This log through a line 62 connects with an indicating head 63 which contains a gear train by which an arbor 64 is caused to make one revolution to each nautical mile. Loose on this arbor is a contact actuating cam 65 which engages one of two contact fingers 66 and 67. The cam is connected with the arbor through a spring 68. A pin 71 projects from its upper face and is engaged by one dog 72 of an anchor escapement. A pin 73 projects from its under face and is engaged by the other dog 74 of the anchor escapement. The escapement is operated by an eccentric 75 on the arbor through an arm 76. The pins are so positioned in the cam that when the first mentioned pin is released it will make nearly a complete revolution and during most of the time while it is moving under the impulse of the spring the contacts are pressed together. When the other pin is released there is only a slight movement without closing the contacts. Hence the time during which the contacts are closed depends on the strength of the spring and the inertia of the cam and is therefore substantially uniform and independent of the speed of the log and there is no point at which the log could stop and leave the contacts closed. Waste of electric current is thereby avoided. The log sends an electrical impulse to each revolution of the arbor 64, that is to say an impulse for each nautical mile.

The instrument as shown admits a chart which includes an area sixty degrees in length and twenty degrees in width. Limitation to these dimensions is not essential, but this is sufficient to include almost any unbroken course on one chart. For a course which crosses the equator and is longer than sixty degrees a separate chart is used for each side of the equator. The size of the instrument is thereby kept down.

The chart is constructed as a projection from a sphere to a cylinder tangent along a great circle which crosses the equator at some even ten degree angle and passes nearest to the course for which the chart is prepared. Such a great circle will be tangent to parallels of north and south latitude the same as the angle at which it crosses the equator. For additional accuracy, a conformal sphere of 6,361.894 kilometers radius is made the basis of the projection on a scale of one ten-millionth as set forth in my divisional application filed December 12, 1924, Serial No. 755,415.

A protractor 81 and a protractor pointer 82 are carried by the position indicating member, and one of them, preferably the protractor to effect direct reading, is free to turn on the arm of the position indicating member. A wing piece 83 is carried by the protractor and is engaged by a pole locating guide 84. This is a forked piece which is pivoted in a latitude arc support 85. The wing piece passes in its own plane through the forked guide. Pivot holes 86, 86 at ten degree intervals are provided along the latitude arc support, and in any one of these the guide may be carried. The latitude arc support is carried from the great circle arc under the table, preferably through an extension arc 87 so as to permit a greater range of adjustment, as for example when it is necessary to carry the latitude arc support from a position on the great circle which is not under the table as shown in Fig. 2. The pole locating guide is so placed that if the chart were extended to include the North or South Pole a right line through the ball socket of the instrument and the pole of the chart would also pass through the pole guide. It is not thought necessary to make either the latitude or great circle adjustments continuous and there is only provision for setting at even ten degree intervals, for charts may be drawn so as to be suited to these adjustments and made to include any course.

The radius of the chart support should correspond to the radius of the sphere on the same scale as the chart and will therefore be 636.18 millimeters.

In using the instrument a chart including the course to be followed is placed upon the support and secured. The pole locating guide is positioned in line with the meridians of the chart. The destination indicating member is set on the port of destination if there is a clear course thereto. If the course is intercepted by a cape or other obstruction, then the destination indicator is set at a safe distance off such obstruction. The other indicator is set on the present location of the vessel, the instrument is clamped and the electromagnet is connected with the log. The vessel is then steered as shown on the protractor the indication of which will be continually changing, making the necessary allowances for magnetic variation, drift and current. As astronomical sights are taken or the position is otherwise ascertained the instrument is unclamped and reset.

It has been found possible to construct a map for consultation on a plane surface with ordinary drafting tools so that any two intersecting lines will be at the same angle on the map as on the earth's surface. A Mercator projection is such a map and a straight line thereon is a rhumb course, but does not represent the shortest distance between two points. Also a map can be constructed representing a spherical surface on a plane so that any straight line on the map will designate the arc of a great circle on the sphere and the shortest distance between the points at the ends of the line on the spherical surface. If projected from the sphere above defined a straight line between any two points will indicate a course which will never deviate from the shortest course on the spheroid by more than a third of a kilometer and will negligibly differ therefrom in length. Also a map can be constructed, if limited to twenty degrees in width, so that the difference in scale between the edges and the center will be limited to one and one-half percent. But each of these three maps involves a sacrifice of the desirable properties of the other two. However, a chart constructed as above defined and consulted with the aid of this instrument will be found to have all of these desirable properties. By setting the two indicating members on any line the protractor will show the angle of such line with the meridian. If it is desired to rule a great circle line on the chart, the two indicating members are set at the ends of the line and then the position indicating member is moved toward the other. If the distance is to be ascertained, the position indicating member is moved by turning the arbor 43 and counting the number of revolutions, each revolution indicating fifteen nautical miles, and each tooth of the ratchet indicating one nautical mile.

I claim,

1. In a ship's position indicator, a chart support, a chart, a destination indicating member universally adjustable with respect to the chart, a position indicating member, and automatic means for moving the position indicating member toward the destination indicating member proportionally to the distance traversed by the ship as shown on the chart.

2. In a ship's position indicator, a chart support, a chart, a destination indicating member and a position indicating member both of which are universally adjustable with respect to the chart, and automatic means for moving the position indicating member toward the destination indicating member proportionally to the distance traversed by the ship as shown on the chart.

3. In a ship's position indicator, a concave chart support, a chart, a destination indicating member and a position indicating member both of which are universally adjustable with respect to the chart support about the center of the concavity, and automatic means for moving the position indicating member toward the destination indicating member proportionally to the distance traversed by the ship as shown on the chart.

4. In a ship's position indicator, a cylindrically concave chart support, a chart, a destination indicating member and a position indicating member which is radially extensible both of which are adjustable with respect to the chart support about a point on the axis of the concavity, and automatic means for moving the position indicating member toward the destination indicating member proportionally to the distance traversed by the ship as shown on the chart.

5. In a ship's course and position indicator, a chart support, a pole locating guide, a chart, a destination indicating member and a position indicating member both of which are universally adjustable with respect to the chart, and a protractor and an indicator therefor carried by the position indicating member one of which is connected to the pole locating guide.

6. In a ship's course and position indicator, a chart support, a pole locating guide, a chart, a destination indicating member and a position indicating member both of which are universally adjustable with respect to the chart, a protractor and an indicator therefor carried by the position indicating member one of which is connected to the pole locating guide, and automatic means for moving the position indicating member toward the destination indicating member proportionally to the distance traversed by the ship as shown on the chart.

7. In a ship's course and position indicator, a concave chart support with a great circle arc, a pole locating guide, an arc support for the pole locating guide with a latitude arc along which the guide is adjustable, the arc support being adjustable along the great circle arc of the chart support, a chart, a destination indicating member and a position indicating member both of which are universally adjustable with respect to the chart support, and a protractor and an indicator therefor carried by the position indicating member one of which is connected to the pole locating guide.

SAMUEL W. BALCH.